(12) United States Patent  
Hirashima et al.

(10) Patent No.: US 11,751,259 B2
(45) Date of Patent: Sep. 5, 2023

(54) COMMUNICATION METHOD IN VEHICLE SYSTEM AND COMMUNICATION MANAGEMENT METHOD IN IN-VEHICLE NETWORK

(71) Applicant: DENSO CORPORATION, Kariya (JP)

(72) Inventors: Yuuto Hirashima, Kariya (JP); Tomohiro Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 162 days.

(21) Appl. No.: 17/367,695

(22) Filed: Jul. 6, 2021

(65) Prior Publication Data

US 2022/0104285 A1  Mar. 31, 2022

(30) Foreign Application Priority Data

Sep. 30, 2020 (JP) .................. 2020-165368

(51) Int. Cl.
*H04W 76/10* (2018.01)
*H04L 67/06* (2022.01)
*H04W 4/40* (2018.01)

(52) U.S. Cl.
CPC ............. *H04W 76/10* (2018.02); *H04L 67/06* (2013.01); *H04W 4/40* (2018.02)

(58) Field of Classification Search
CPC . H04L 67/06; H04L 43/0805; H04L 43/0876; H04L 43/20; H04L 67/12; H04L 67/34; H04L 67/60; H04W 4/40; H04W 76/10; H04W 12/08; H04W 4/44; H04W 4/48
See application file for complete search history.

(56) References Cited

U.S. PATENT DOCUMENTS

| 2012/0196544 A1* | 8/2012 | Bolingbroke ........ H04B 1/3822 455/68 |
| 2016/0065298 A1 | 3/2016 | Nakagawa et al. |
| 2018/0139410 A1* | 5/2018 | Zhao ..................... H04L 65/403 |

FOREIGN PATENT DOCUMENTS

JP   2016-48848 A   4/2016

* cited by examiner

*Primary Examiner* — Zhensheng Zhang
(74) *Attorney, Agent, or Firm* — Harness, Dickey & Pierce, P.L.C.

(57) ABSTRACT

A vehicle system includes a plurality of applications issuing a request for a communication with an outside of a vehicle, a communicator device performing the communicating, and a network coordinator managing the request for the communication from the plurality of applications. In a communication method in the vehicle system, when the network coordinator receives a request for a connection with an outside of the vehicle from the application, the network coordinator determines whether or not to permit the connection with the outside of the vehicle, and the network coordinator notifies the application of a determination result of the connection with the outside of the vehicle.

9 Claims, 11 Drawing Sheets

COMMUNICATION METHOD IN VEHICLE SYSTEM AND COMMUNICATION MANAGEMENT METHOD IN IN-VEHICLE NETWORK

CROSS REFERENCE TO RELATED APPLICATION

The present application is based on Japanese Patent Application No. 2020-165368 filed on Sep. 30, 2020, the disclosure of which is incorporated herein by reference.

TECHNICAL FIELD

The present disclosure relates to a communication management technology in an in-vehicle network.

BACKGROUND

There is provided a technique for suppressing a decrease in communication speed in communication between an external device and an internal device. According to the configuration in the above technique, it is determined whether to permit the data communication between a first communication device and a second communication device as a communication partner of the first communication device based on predetermined authentication information included in the first communication frame used for the first communication protocol received from the first communication device. When the data communication is permitted, a control signal is output which sets the second communication device as the communication partner to a connection destination.

The number of electronic control units (ECUs) mounted on vehicles has been increasing. Further, as a vehicle control method, it is assumed that a central ECU is arranged and a plurality of in-vehicle ECUs, sensors, actuators, and a cloud or a center are connected to the central ECU. It is necessary to properly monitor communication inside the vehicle and communication between inside and outside the vehicle.

SUMMARY

According to an example of the present disclosure, a communication method is provided to a vehicle system that includes a plurality of applications issuing a request for a communication with an outside of a vehicle, a communicator device performing the communicating, and a network coordinator managing the request for the communication from the plurality of applications. In the communication method in the vehicle system, when the network coordinator receives a request for a connection with an outside of the vehicle from the application, the network coordinator determines whether or not to permit the connection with the outside of the vehicle, and the network coordinator notifies the application of a determination result of the connection with the outside of the vehicle.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Embodiment

Figure 1:
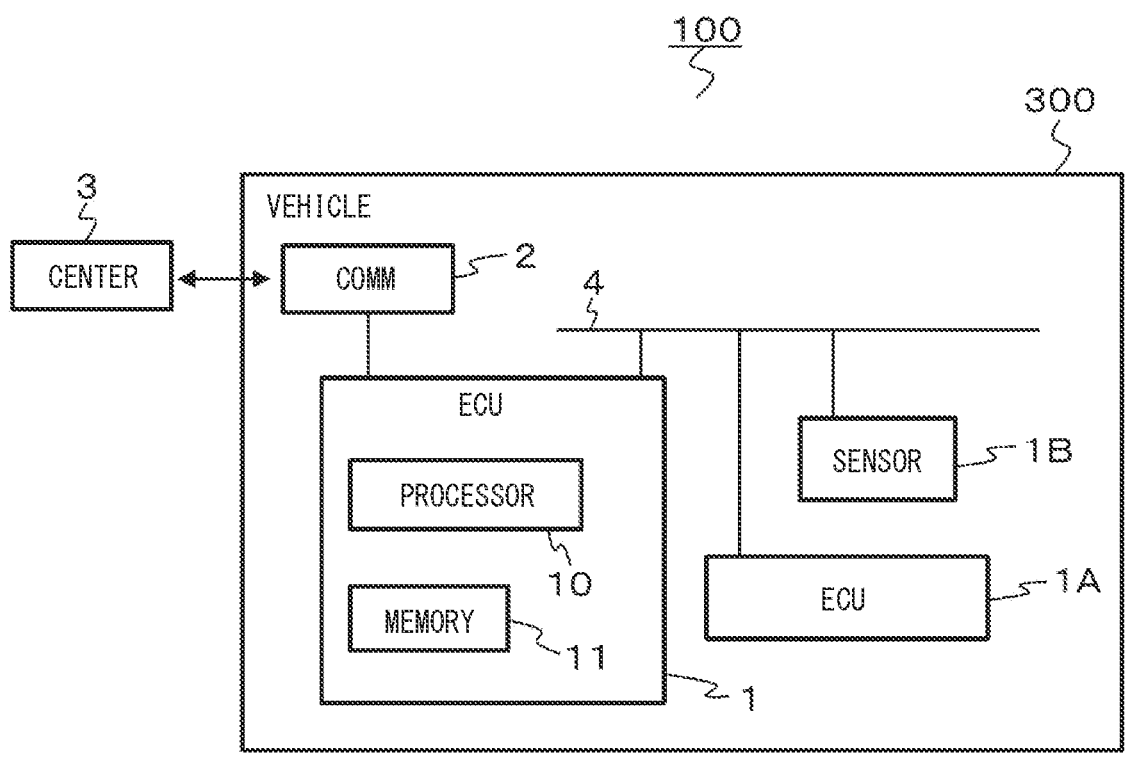
FIG. 1 is a diagram showing a schematic configuration of a communication system.

The configuration of an in-vehicle communication system 100 of the present disclosure will be described. The in-vehicle communication system 100 is also simply described as a communication system. The in-vehicle communication system 100 includes an electronic control unit 1, an electronic control unit 1A, a sensor 1B, a communicator device 2, and an in-vehicle network 4. The electronic control unit 1 is also called a central ECU or an integrated ECU. The in-vehicle network 4 corresponds to, for example, Ethernet or an in-vehicle communication line based on Ethernet. Although not shown, an actuator or the like may be connected to the in-vehicle network 4. The in-vehicle network 4 connects, with each other, a plurality of respective nodes (e.g., the electronic control unit 1, the electronic control unit 1A, the sensor 1B, the communicator device 2, the actuator) inside the vehicle or in the vehicle 300. The communicator device 2, which may also referred to as a transceiver, communicates with nodes (e.g., center, server, cloud, roadside terminal, mobile communication terminal) outside of the vehicle. The communication system 100 may be defined to include the center 3 that communicates with the communicator device 2, in addition to the above components or configuration mounted on the vehicle 300. The center 3 is also called a server or cloud.

The electronic control unit 1 includes at least one processor 10 and at least one memory 11. The electronic control unit is also called an ECU. Although one electronic control unit 1 alone is shown in FIG. 1, the number of electronic control units may be more than one. Similarly, each of the number of communicator devices 2 and the number of centers 3 may be more than one.

The electronic control unit 1 further includes, in addition to the processor 10 and the memory 11, an I/O and a bus connecting these and executes various processes by executing the control programs stored in the memory 11. The memory 11 is a non-transitory tangible storage medium for storing computer-readable programs and data. The non-transitory tangible storage medium may be provided by a semiconductor memory or a magnetic disk. Further, as described above, the functions (including the function of the network coordinator 20 described below) provided by the electronic control unit 1 are realized by the processor 10 executing a program stored in the memory. However, there is no need to be limited thereto; namely, the functions provided by the electronic control unit 1 may be realized by software basis, or by hardware basis, or by a combination of software basis and hardware basis, which will be described in detail to be later. The electronic control unit 1A has the same hardware configuration as the electronic control unit 1. The electronic control unit 1, 1A corresponds to a controller or a controller circuit.

The memory 11 stores a network coordinator program; by the processor 10 executing the network coordinator program, the function of the network coordinator 20 is realized. Furthermore, in the embodiment, the network coordinator 20 is provided as software in the electronic control unit 1, but a part or all of the network coordinator 20 may be configured as hardware. In other words, the network coordinator 20 may be provided as a specific (network management) controller or controller circuit to provide a function of the network coordinator; such a specific controller may be provided to be separated from or integrated with the electronic control unit 1 and may be realized by software basis, or by hardware basis, or by a combination of software basis and hardware basis, which will be described in detail to be later.

Figure 2:
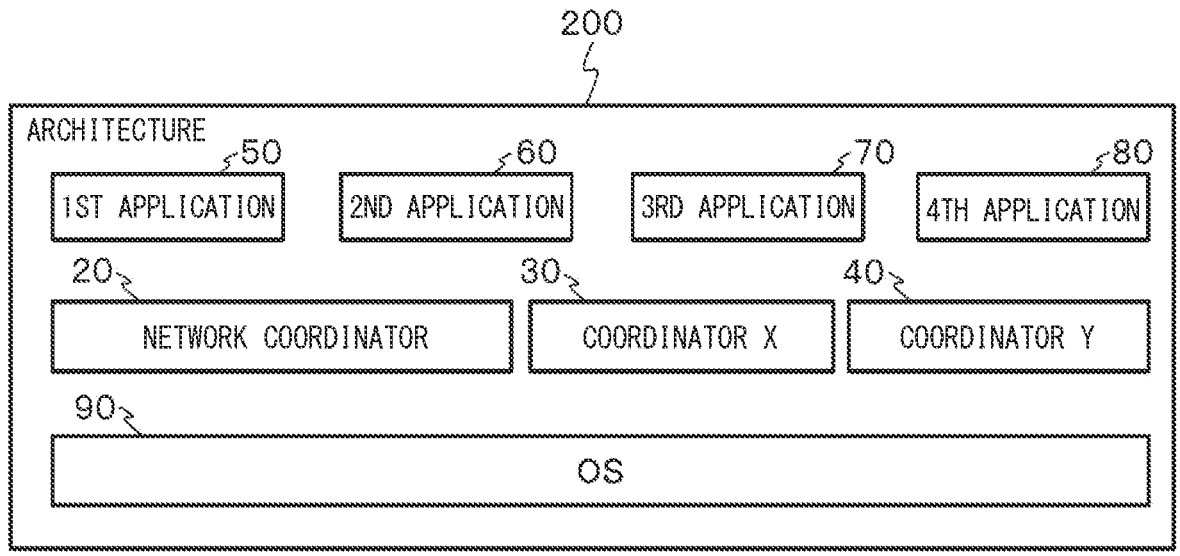
FIG. 2 is a diagram illustrating a logical architecture including a network coordinator.

FIG. 2 illustrates a logical architecture 200 that includes a network coordinator 20. In the vehicle 300, middleware such as the network coordinator 20, the coordinator X 30, and the coordinator Y 40 operates on the OS 90 (operating system 90) as a software program. The coordinator may also be called middleware, management device, management module, management controller, manager, controller, and the like. A first application 50, a second application 60, a third application 70, and a fourth application 80 operate by using the services provided by one or more coordinators, to provide functions for each application. The OS 90 may be a virtual OS. Further, the application, the coordinator, and the OS may be executed by the same electronic control unit or may be executed respectively by different electronic control units. For instance, in the electronic control unit, the memory stores a respective software program, which is to be executed by a processor to implement the application, the coordinator, or the OS. FIG. 2 is an example, and the number of OSs, the number of coordinators, and the number of applications are not limited thereto.

Figure 3:
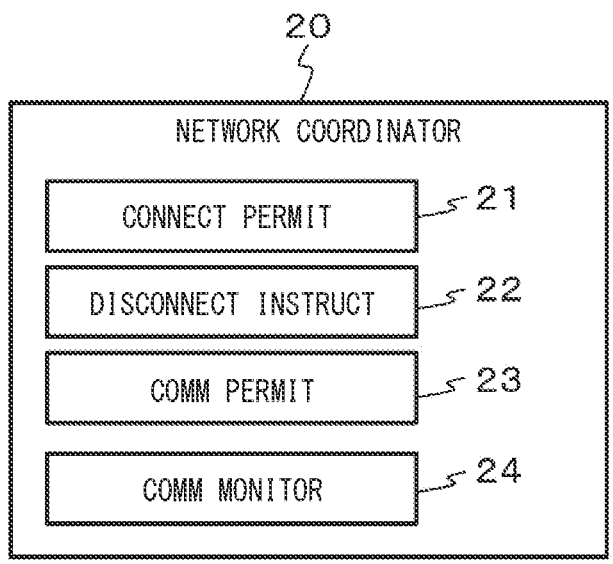
FIG. 3 is a diagram illustrating a configuration of a network coordinator.

The network coordinator 20 will be described with reference to FIG. 3. The network coordinator 20 monitors the state of communication resources (also referred to as bandwidth usage state and communication traffic state), detects anomalies, and records a log of communication state. The network coordinator 20 determines whether or not communication is possible based on the state of the communication resource in response to a communication availability inquiry from an application to use the communication resource. The network coordinator 20 also notifies the application of the result.

The network coordinator 20 does not operate communication resources except when an abnormality occurs. In order to prevent the communication resource from being changed at an unintended timing of the application that uses the communication resource to induce other errors, the network coordinator 20 does not directly operate the resource. Instead, each application operates communication resources. The network coordinator 20 does not hide the communication protocol. The application performs communication control according to the communication protocol. The network coordinator 20 includes a connection permission unit 21, a disconnection instruction unit 22, a communication permission unit 23, and a communication monitoring unit 24.

The connection permission unit 21 permits the application to connect. Specifically, the connection permission unit 21 receives a request for connection permission from an application. The connection permission unit 21 determines whether or not the connection is possible, that is, whether to permit or refuse the connection, based on the priority of the application, the state of the communication resource, and the like. The connection permission unit 21 notifies the application waiting for connection permission of the connection determination result.

The disconnection instruction unit 22 issues an instruction of the disconnection of communication (communication end). Specifically, the disconnection instruction unit 22 issues a disconnection instruction to the application connecting to the communication resource. The application notifies the network coordinator of the end of communication when the communication ends. The disconnection instruction unit 22 confirms that the application has disconnected from the communication resource. The disconnection instruction unit 22 may issue a disconnection instruction to the communication resource. The communication resource corresponds to a port connecting an application to a connection destination, a communication middleware, or a communication interface. Alternatively, the communication resource indicates a communication environment (for example, a communication band) provided by a port, communication middleware, or a communication interface. When the application needs to stop communication due to factors such as the start of communication of another high priority application or a device error during communication, the network coordinator 20 notifies the application of the end of communication. When the application receives the instruction to stop communication, it discards the communication resource and notifies the network coordinator of the end of communication. The network coordinator 20 accepts the end of communication and updates the communication state. The connection destination may be a node inside the vehicle or a node outside the vehicle. Components that communicate in the vehicle, such as an application, an electronic control unit 1, 1A, a sensor 1B, and an actuator each correspond to a node inside or in the vehicle. In addition, components that communicate with in-vehicle applications, such as centers, servers, clouds, or mobile communication terminals, that are outside the vehicle or are not fixed to the vehicle each correspond to a node outside the vehicle.

The communication permission unit 23 permits communication by the application. Specifically, the communication permission unit 23 accepts or receives a request for the start of the communication from the application. When the application starts communication, it confirms with the network coordinator 20 whether communication is possible. The communication permission unit 23 determines whether or not communication can be started based on the priority of the application, the state of the communication resource, and the like. The communication permission unit 23 notifies the application waiting for the permission of the start of the communication of the communication start determination result.

The communication monitoring unit 24 monitors communication. Specifically, the communication monitoring unit 24 monitors the communication resource usage state and communication state of the application, and monitors the traffic amount at regular time intervals. The communication monitoring unit 24 monitors the communication and notifies the application of the state when there is a change in the communication state. The communication monitoring unit 24 monitors the connection with other nodes at regular intervals. The communication monitoring unit 24 may monitor the link-up of the PHY device (PHY port) at regular intervals. The communication monitoring unit 24 may monitor the frames transmitted and received by the Ethernet switch. The communication monitoring unit 24 may monitor the MIB information of the Ethernet switch. The communication monitoring unit 24 may monitor the power state of the Ethernet switch.

The network coordinator 20 may include some or all of the following functions in addition to the connection permission unit 21, the disconnection instruction unit 22, the communication permission unit 23, and the communication monitoring unit 24. The network coordinator 20 may be configured to recover from an abnormality. Specifically, the network coordinator 20 may link down/up the port. The network coordinator 20 may reset the power supply of the PHY device (PHY port). The network coordinator 20 may refresh the registers of the PHY device (PHY port). The network coordinator 20 may refresh the registers of the Ethernet switch.

The network coordinator 20 may be configured to log communication. Specifically, the network coordinator 20 may store the collected log in the storage. The network coordinator 20 may log the connection monitoring record with other nodes. The network coordinator 20 may record the time when the link is up/down. The network coordinator 20 may log the time when the application requests port opening and closing. The network coordinator 20 may log the time when the application opens and closes the port.

Figure 12:
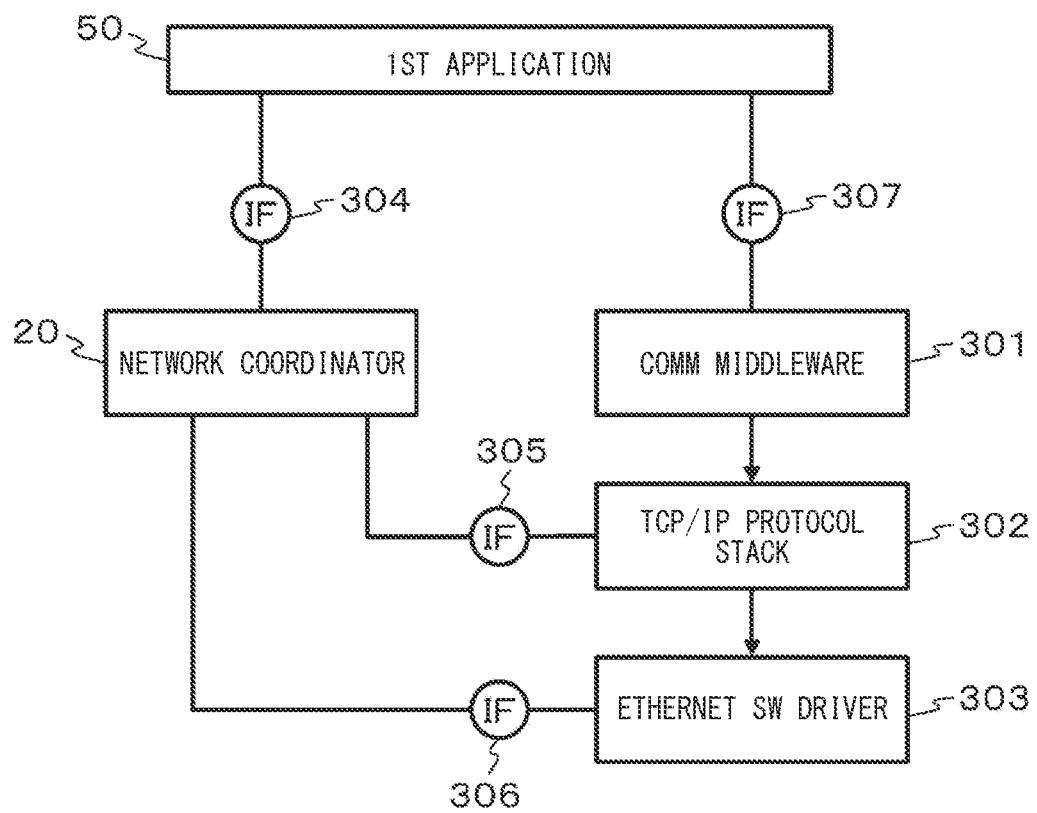
FIG. 12 is a diagram illustrating a network coordinator, an application, and other configurations.

The network coordinator 20 may check whether the application is in a communicable state when performing initialization. When setting the routing, the network coordinator 20 may set the register of the Ethernet switch according to the predetermined routing rule. When setting the access control, the network coordinator 20 may set the register of the Ethernet switch according to the predefined access control list, or set the port opening/closing of the TCP/IP protocol stack according to a predefined access control list. When performing the termination process, the network coordinator 20 may instruct the communication application to end the communication, or discard the message accumulated in the Ethernet switch. FIG. 12 is a diagram illustrating the relationship between the network coordinator 20, the first application 50, and other components.

The network coordinator 20 is connected to the first application 50 via an interface (IF) 304, is connected to a TCP/IP protocol stack 302 via an IF 305, and is connected to an Ethernet switch driver 303 via an IF 306. Further, the first application 50 and the communication middleware 301 are connected via an IF 307.

The first application 50 uses an IF 304 to confirm the start of communication, issue a notification of an end at the end of communication (i.e., report an end), and confirm the communication state. Further, after receiving the permission of the start of the communication via the IF 304, the first application 50 secures a communication resource (bandwidth) and performs communication using the IF 307.

The network coordinator 20 uses the IF 305 and the IF 306 to monitor the states of communication resources. The network coordinator 20 monitors the communication state while the first application 50 and its connection destination are connected and communicate with each other, but does not have a function of passing data between the application and its connection destination. With this configuration, a high priority application (for example, emergency call application) can be reliably communicated. It also saves the computational resources required by the network coordinator 20.

(Process)

Figure 4:
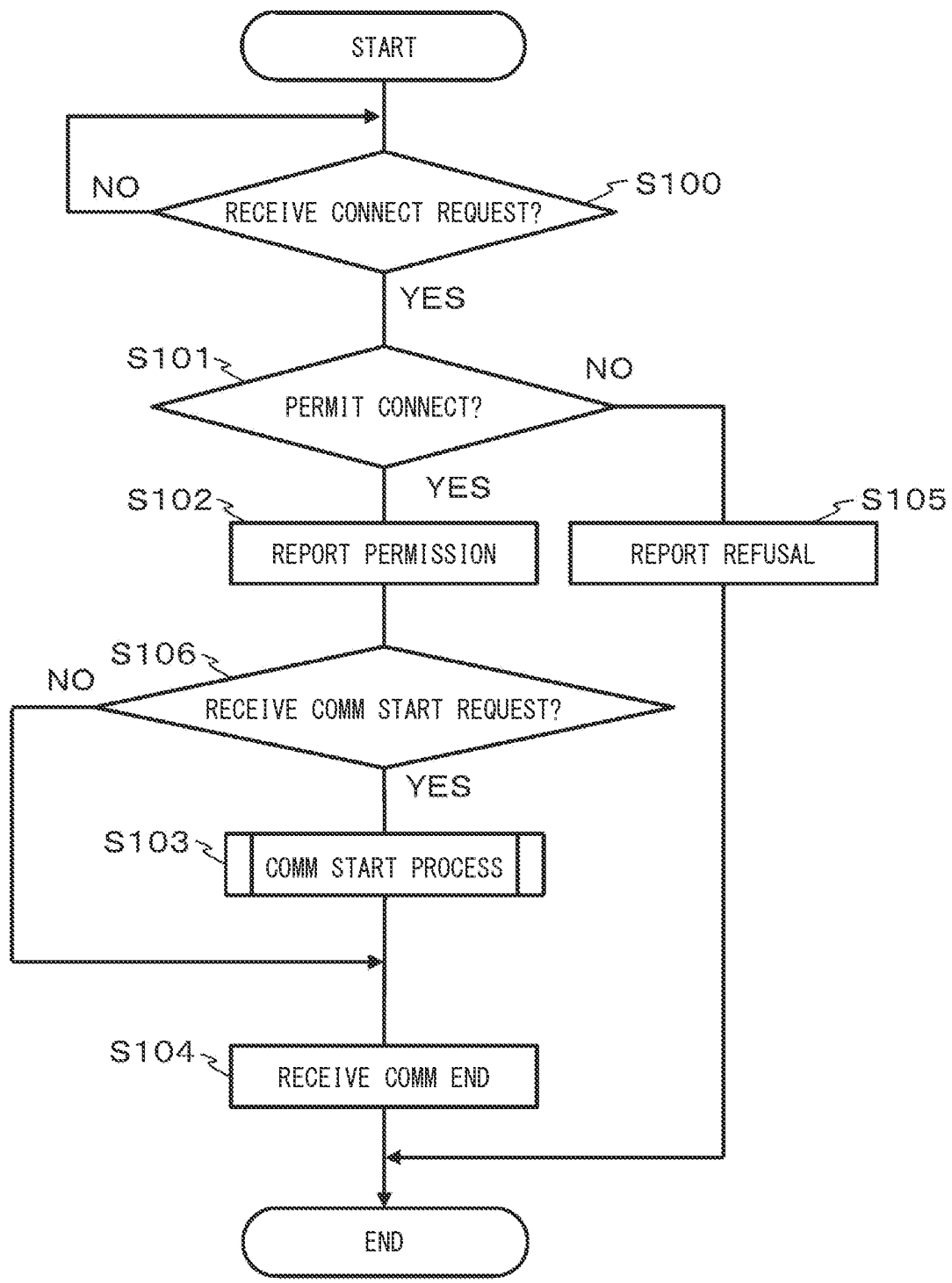
FIG. 4 is a flowchart illustrating a communication network control process by a network coordinator.

FIG. 4 is a flowchart illustrating a communication network control process by the network coordinator 20. The communication network control process by the network coordinator 20 will be described with reference to FIGS. 4 to 7. The communication network control process is executed by, for example, the electronic control unit 1. Further, the communication network control process is repeatedly executed while the network coordinator program is being executed. The communication network control process starts every time an application requests connection and communication with a node. Suppose a case where an application A starts a first communication network control process in order to connect and communicate with a center, and then requests connection and communication with another node. In such a case, a second communication network control process starts.

In S100, it is determined whether or not the connection permission unit 21 has received a connection request from an application. While it is determined that the connection request has not been received, S100 is repeated. If the connection permission unit 21 determines that the connection request has been received from any of the applications, the process proceeds to S101. Alternatively, if it is determined that the connection request has not been received, this process may be ended. The communication network control process may be started at predetermined time intervals, or may be started when receiving a connection request to a connection destination such as another node, or center from an application.

The process of starting a connection is illustrated below. The application determines to need to communicate with another node. When the application starts the connection, it confirms with the network coordinator 20 whether communication is possible. The application transmits, for example, the port number to be used, the protocol (for example, TCP/UDP), and the information on the application ID that identifies the application requesting the start of communication, to the network coordinator 20. The port number is used to monitor the port for determining whether communication is possible. The network coordinator 20 determines whether or not the connection is possible, and transmits information such as a communication availability result and a factor when communication is not possible, to the application that requested the connection.

In S101, the connection permission unit 21 determines whether or not to permit the connection based on the priority of the application and/or the state of the communication resource. The connection permission unit 21 may determine whether or not to connect based on the amount of available communication resource. If an affirmative determination is made in S101, the process proceeds to S102. If a negative determination is made in S101, the process proceeds to S105.

In S105, the network coordinator 20 issues a notification of connection refusal (i.e., reports a connection refusal) to the application. The operation of the application whose connection is refused is defined for each application. For example, the application whose connection is refused may issue a request for connection with the connection destination again after a lapse of a predetermined time. In this case, the communication network control process of FIG. 4 starts from S100.

In S102, the connection permission unit 21 issues a notification of the connection determination result to the application waiting for connection permission. Specifically, it notifies that the connection is permitted (i.e., it issues a notification of connection permission or reports a connection permission). In addition, the application permitted to connect accesses the communication port (corresponding to the communication middleware) and secures the communication resource. The application then establishes the connection with the connection destination (e.g., center, another node). The process proceeds to S106.

In S106, the communication permission unit 23 determines whether or not the application has requested permission to start communication. Upon receiving the request for permission to start communication, the process proceeds to S103. If there is no request for permission to start communication, the process proceeds to S104. Since it is unknown when the application transmits the communication end notification to the network coordinator 20, the process is waiting in S106. It can thus be said that if the communication start request is received, the process proceeds to S103, and if the communication end notification is received, the process proceeds to S104. Alternatively, after a negative determination in S106, it may be determined whether or not the communication end notification has been received. In this case, when the communication end notification is received (affirmative determination), the process proceeds to S104. On the other hand, if the communication end notification is not received, the configuration may be such that the system returns to S106. The request for communication start is issued from an application, for example, (i) when the communication volume exceeds a predetermined value, (ii) the rate of change of the communication volume exceeds a predetermined value, or (iii) when a predetermined condition for increasing the load on the communication network is satisfied. Alternatively, after the connection is established, the request for communication start may be issued whenever communication is to be started.

Figure 6:
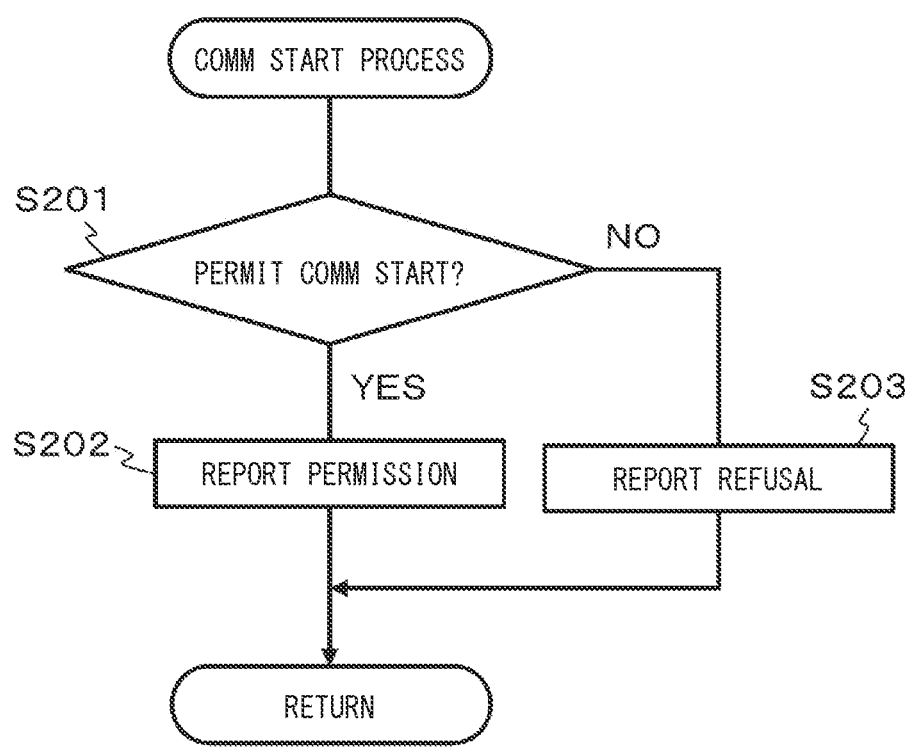
FIG. 6 is a flowchart illustrating a communication start process.
Figure 7:
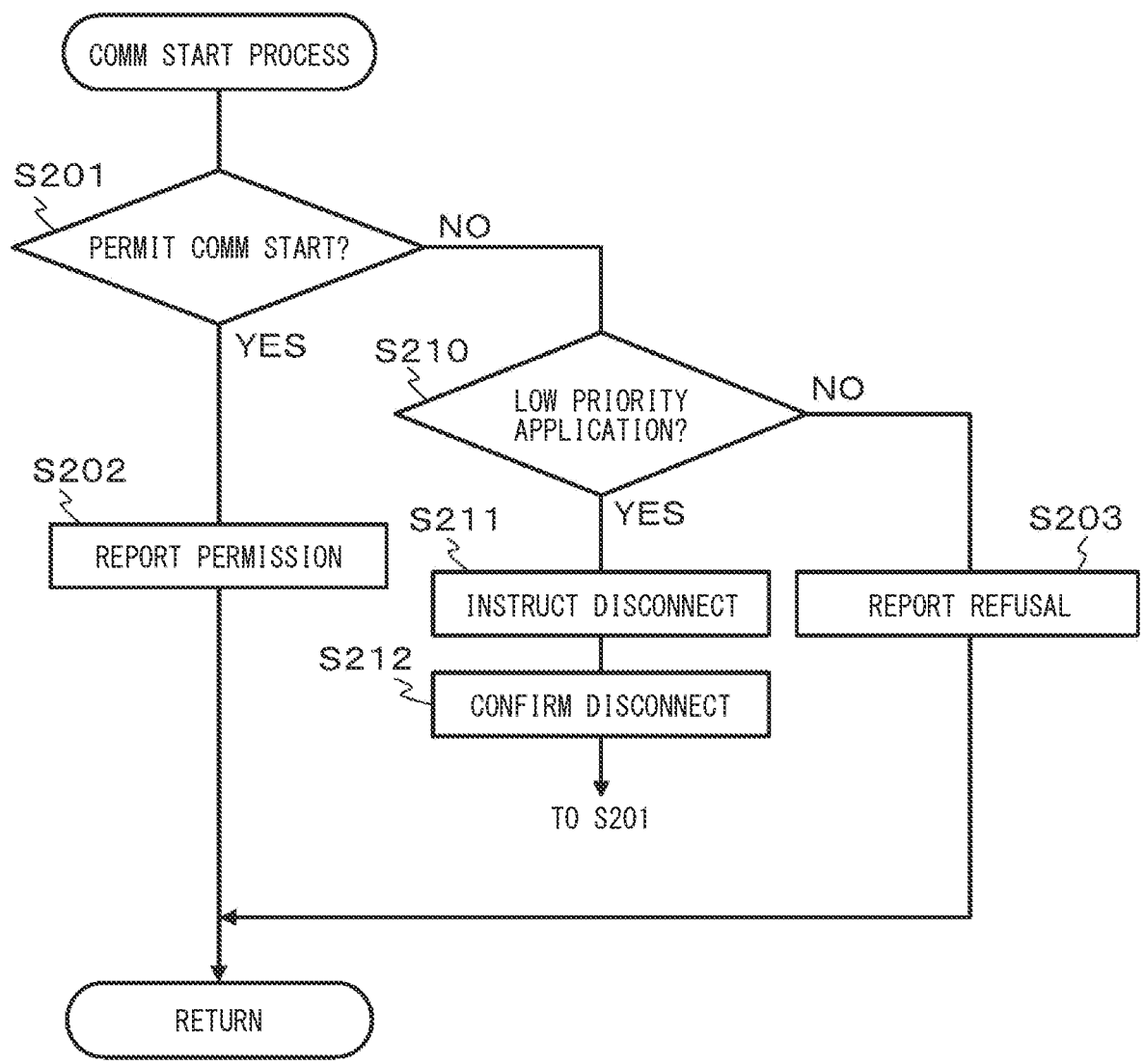
FIG. 7 is a flowchart illustrating a communication start process.

In S103, the communication start process of FIG. 6 or 7 is performed. First, the communication start process will be described with reference to FIG. 6. S103 is carried out by the communication permission unit 23. In S201, it is determined whether or not to permit the application to start communication based on (i) the application priority and/or (ii) the state of the communication resource (for example, the band usage state). In the case of affirmative determination, in S202, a notification of permission to start communication is issued to the application (i.e., a permission to start communication is reported to the application). In the case of a negative determination, in S203, a notification of refusal to start communication is issued to the application (i.e., a refusal to start communication is reported to the application). The operation of the application when the communication start has been refused is defined for each application. For example, an application may issue a request for permission to start communication again after a lapse of a predetermined time. Alternatively, one application may disconnect from the connection destination and issue a notification of communication end to the network coordinator 20.

The application transmits, receives, or transmits and receives data to and from the connection destination. When the communication with the connection destination is ended, the application issues a notification of communication end to the network coordinator 20. In S104, the disconnection instruction unit 22 confirms that the application discards the communication resource and disconnects from the connection destination (i.e., stops or breaks the connection with the connection destination). Further, suppose a case where the disconnection instruction unit 22 receives the notification of communication end from the application, but the application maintains the connection with the communication resource. In such a case, the disconnection instruction unit 22 may issue an instruction to the application to disconnect, or may issue an instruction to the communication resource to disconnect.

The process at the end of communication is illustrated below. The first case is a case where the communication is ended from the application. When the application ends the communication, it notifies the communication middleware of the discard of the communication resource. After that, the application transmits, as a notification of communication end, (i) information on the used port number, (ii) protocol (TCP/UDP), and (iii) application ID, to the network coordinator 20. The network coordinator 20 notifies the application that the notification has been accepted.

The second case is a case where the connection fails and the communication ends. If the communication resource cannot be secured at the time of connection (for example, a socket error occurs), the application retries to secure the communication resource as necessary. If the communication resource still cannot be secured, the application determines that communication is not possible and notifies the network coordinator 20 of the end of communication.

Modified Example

Figure 5:
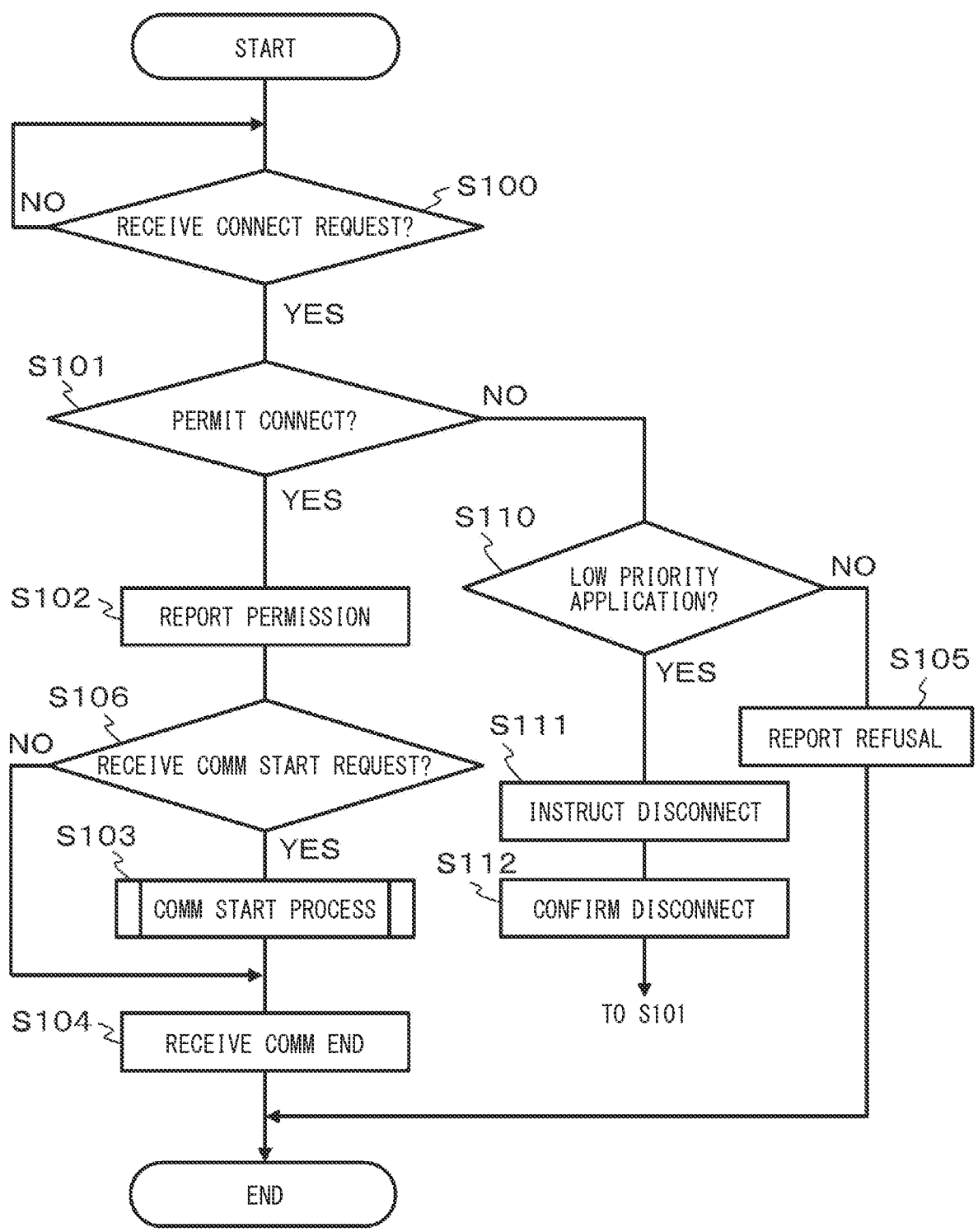
FIG. 5 is a flowchart illustrating a communication network control process by a network coordinator.

Next, a modified example of the communication network control process will be described with reference to FIG. 5. FIG. 5 is a flowchart illustrating a communication network control process by the network coordinator 20. Since S100 to S106 are the same as the above-mentioned communication network control process, the description thereof will be omitted, and the main differences will be described.

In S101, as described above, it is determined whether or not to permit the application to connect to the connection destination. However, in the case of a negative determination in S101, the process proceeds to S110. In S110, it is determined whether or not there is an application (low priority application) having a lower priority than the application (also referred to as a first application) that issued the connection request. Specifically, the priority of the application that issued the connection request is compared with the priority of the application (referred to as a third application) that establishes communication with one of the connection destinations after securing the communication resource. If the priority of the first application is higher than the priority of the third application, the process proceeds to S111. In the case of a negative determination in S110, the process proceeds to S105. S105 is the same as above, and the description thereof will be omitted.

In S111, the disconnection instruction unit 22 instructs the third application or the communication resource that provides the connection environment to the third application to disconnect the communication. Upon receiving the communication disconnection instruction, the third application or the communication resource ends the communication, and the third application notifies the network coordinator 20 of communication end. In S112, it is confirmed that the third application has disconnected from the communication resource. The process returns to S101.

The priority of the application is stored in the memory 11 in advance, for example. In addition, the priority of the application may be set by the center. In addition, the priority of the application may be reported to the network coordinator 20 as a relative or absolute expression by the application.

A modified example of the communication start process will be described with reference to FIG. 7. FIG. 7 is a flowchart illustrating the communication start process. Since S201 to S203 are the same as the communication start process described with reference to FIG. 6, the description thereof will be omitted, and the main differences will be described. In S201, it is determined whether to permit the application to start communication. If the communication start is permitted, the process proceeds to S202. If the communication start is refused, the process proceeds to S210.

In S210, it is determined whether or not there is an application (referred to as a third application) having a lower priority than the application (referred to as a first application) that has notified the network coordinator 20 of the request for connection permission. The determination of the priority of the application is the same as that of S110. If there is a third application having a lower priority than the first application, the process proceeds to S211. If there is no third application having a lower priority than the first application, the process proceeds to S203. S211 is the same as S111. After S211, the process proceeds to S212. S212 is the same as S112. After confirming that the third application has disconnected from the communication resource, the process returns to S201.

The network coordinator 20 may instruct the connection destination and the connected application to stop communication. For example, when an application must stop communication due to a connection start or communication start of another high priority application, a device abnormality, or other factors during communication, the network coordinator 20 notifies the application of communication end. When the application receives the communication stop notification, it discards the communication resource by the communication middleware and notifies the network coordinator 20 of the communication end. The communication end notification includes, for example, information on a port number for stopping communication, a protocol (TCP/UDP), an application ID, and a cause for stopping communication.

Since the application secures the communication resource, when an abnormality occurs in the communication resource, the application may detect the abnormality before the network coordinator 20. In such a case, the application may notify the network coordinator 20 of the communication end after discarding the communication resource.

In the embodiment, the configuration is described in which the application notifies the network coordinator 20 of the request for connection with the connection destination. However, instead of the application, the in-vehicle coordinator other than the network coordinator 20 may notify the network coordinator 20 of the request for connection in order to communicate with the node in the vehicle or the center.

Concrete Example

Next, regarding the present disclosure, the operation of the network coordinator 20 in a specific scene will be described. The communication network control process in a software update and the communication network control process in a remote diagnosis will be described below.

(Software Update)

Figure 8:
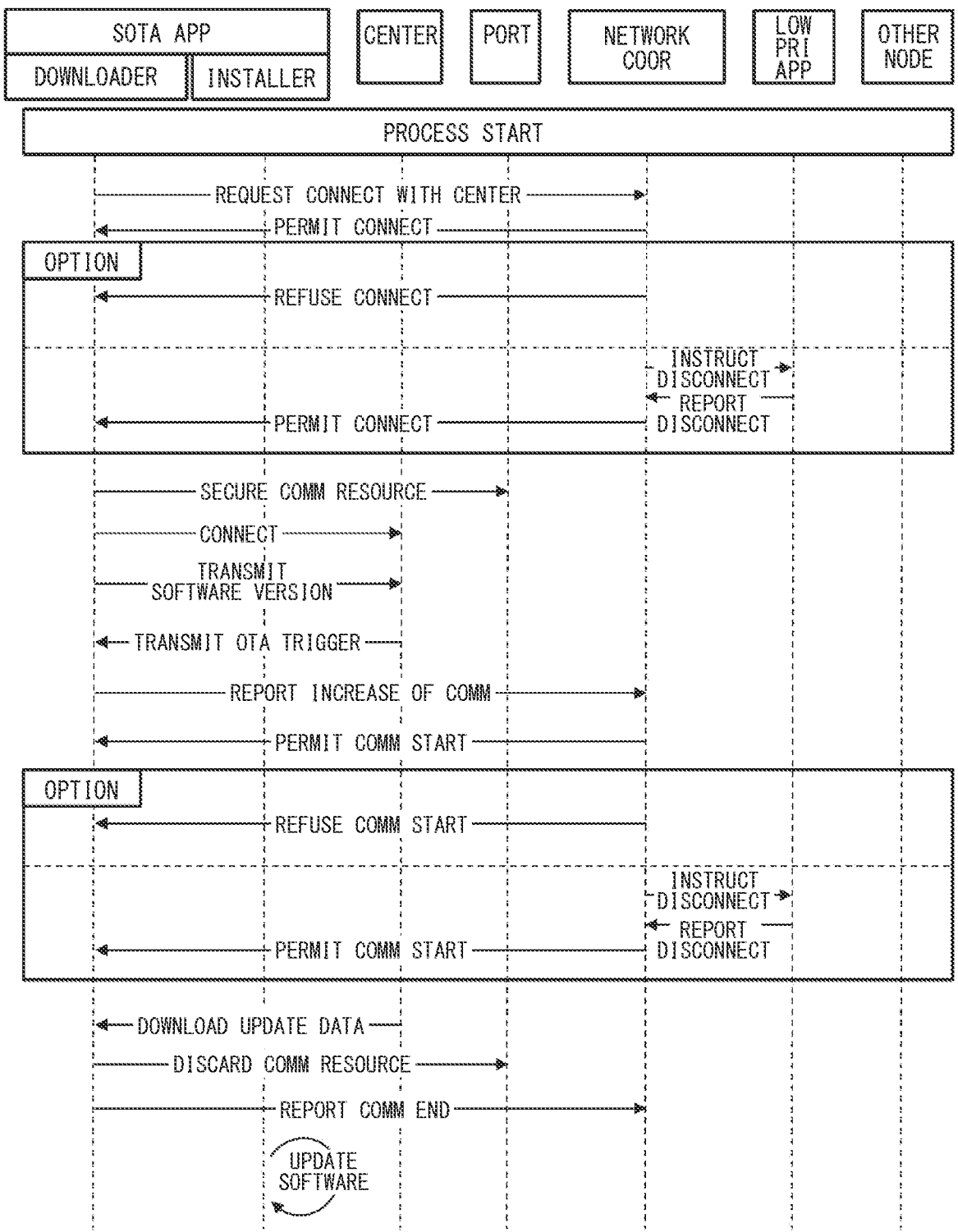
FIG. 8 is a diagram illustrating a sequence in SOTA, and is a diagram showing a sequence from the start of a process to a software update.
Figure 9:
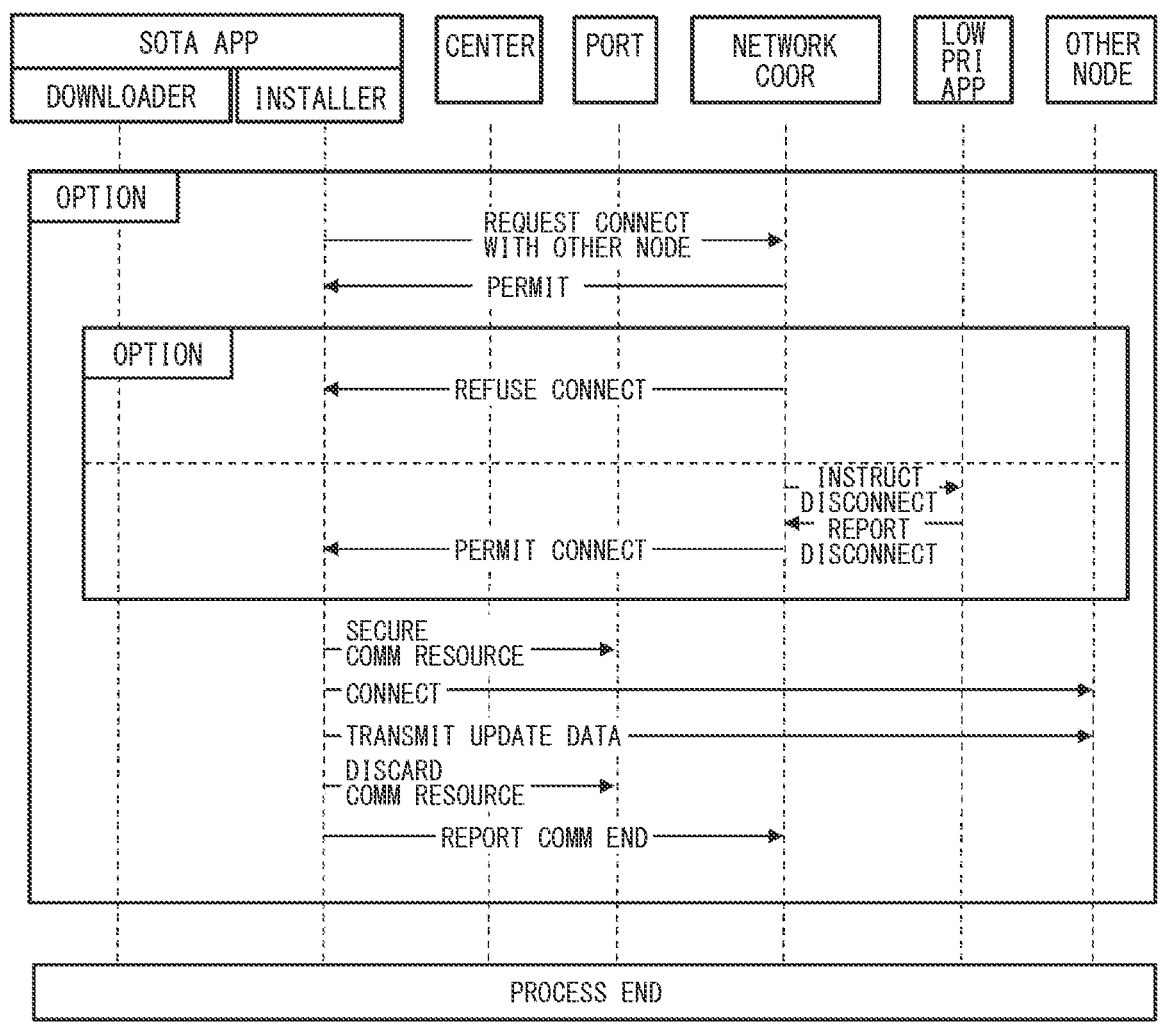
FIG. 9 is a diagram showing a continuation of the sequence in FIG. 8.

FIGS. 8 and 9 are diagrams illustrating the sequence in SOTA. FIG. 8 shows the sequence from the start of the process to the software update. FIG. 9 is a continuation of the sequence of FIG. 8. Note that SOTA is an abbreviation for Software Over The Air, which means that when updating in-vehicle software, data is taken into the in-vehicle ECU via wireless communication for reprogramming.

The SOTA application corresponds to a first application 50. The SOTA application includes a download module for downloading update software and an installation module for installing on the system. The SOTA installer can transfer update data to other nodes. The download module is also called a SOTA downloader. The installation module is also called a SOTA installer. The center corresponds to the center 3. The port corresponds to the communication resource. The low priority application corresponds to a third application 70.

The sequence of FIG. 8 starts, for example, at the timing when the system reprograms with OTA (Over The Air). The SOTA downloader asks the network coordinator 20 for permission to connect to the center. The network coordinator 20 determines whether to permit the connection. If it is determined that the permission is acceptable, the connection is permitted. Alternatively, the connection is rejected. Alternatively, it is determined whether or not there is an application (low priority application) having a lower priority than the SOTA downloader. If there is a low priority application, the instruction to disconnect is issued to the low priority application. When the low priority application disconnects, it notifies the network coordinator 20 of the communication end. This increases the communication resource, so the network coordinator 20 permits the SOTA downloader to connect to the center.

The SOTA downloader secures the communication resource for the port and establishes a connection with the center. The SOTA downloader transmits the software version to the center. The center transmits an OTA trigger to the SOTA downloader. The SOTA downloader notifies the network coordinator 20 that the amount of communication will increase as the update software is received from the center. In other words, the SOTA downloader requires the network coordinator 20 to permit the start of the communication with the center.

The network coordinator 20 determines whether to permit the start of the communication. If the start of the communication is permitted, the permission to start the communication is issued. If the start of the communication is not permitted, the refusal to start the communication is issued. Alternatively, it is determined whether there is a low priority application. If there is a low priority application, the low priority application is instructed to disconnect. When the low priority application disconnects, it notifies the network coordinator 20 of the communication end. This increases the communication resource, so the network coordinator 20 permits the SOTA downloader to start the communication with the center. When the SOTA downloader is permitted to start the communication, it downloads the update data from the center. When the download of the update data is completed, the SOTA downloader notifies the network coordinator 20 of the communication end.

The SOTA installer updates the software using the downloaded update data. Alternatively, when distributing the software to another node, the SOTA installer starts the communication network control process that requests the network coordinator 20 to permit to connect to the other node as follows. The SOTA installer requires the network coordinator 20 to permit to connect to the SOTA downloader on another node.

The network coordinator 20 determines whether to permit the SOTA installer to connect to another node. If the connection is permitted, the network coordinator 20 notifies the SOTA installer of the connection permission. Alternatively, if the connection is not permitted, the network coordinator 20 notifies the SOTA installer of the connection refusal. Alternatively, it is determined whether there is a low priority application. If there is a low priority application, the network coordinator 20 instructs the low priority application to disconnect. When the low priority application disconnects, it notifies the network coordinator 20 of the communication end. This increases the communication resource, so the network coordinator 20 permits the SOTA installer to connect to another node.

If the connection is permitted, the SOTA installer connects to another node. The SOTA installer transmits update data to the SOTA downloader on another node. The SOTA installer reports to the network coordinator that communication has ended. This completes the communication process using the SOTA application.

(Remote Diagnosis)

Figure 10:
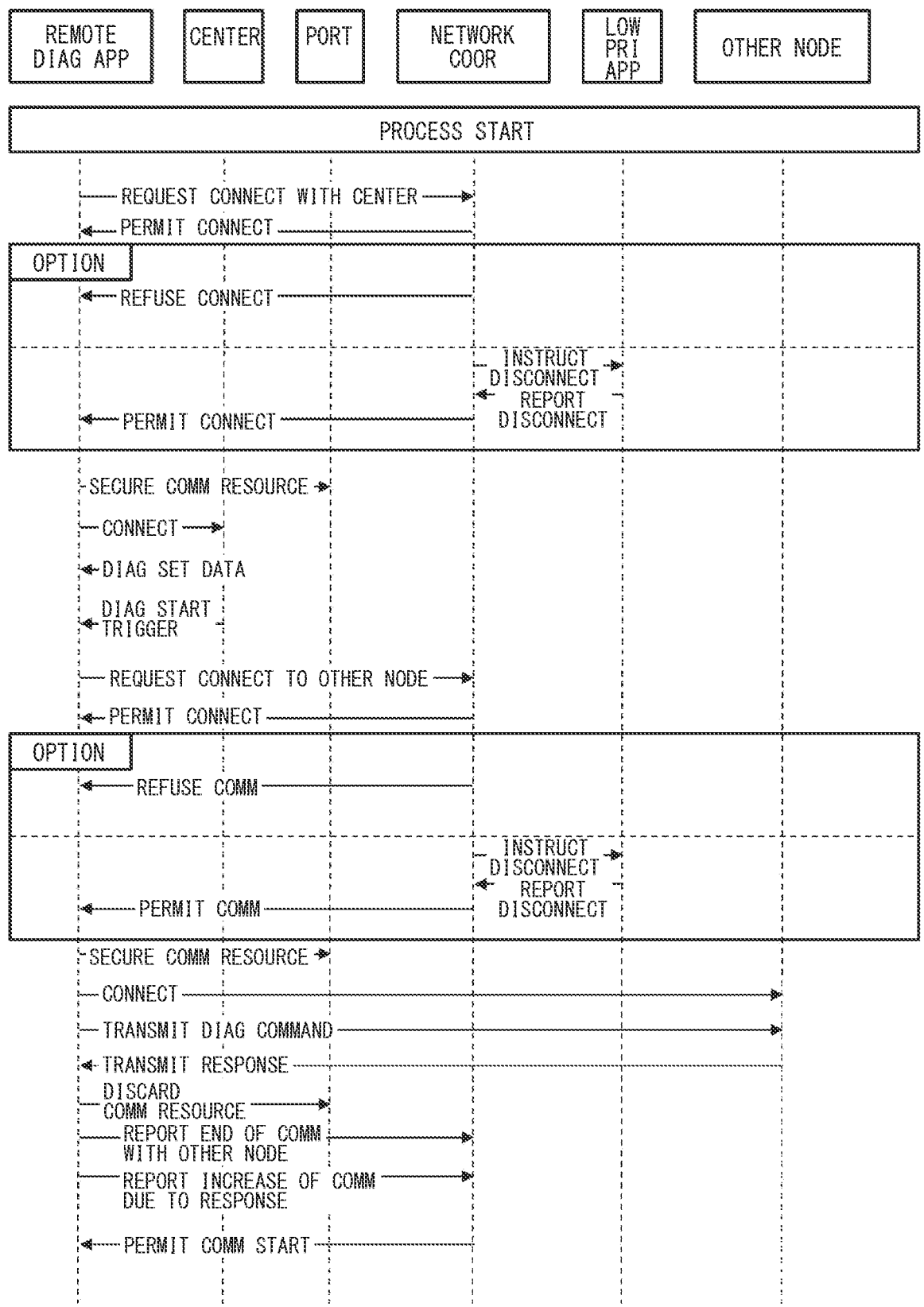
FIG. 10 is a diagram illustrating a sequence in a remote diagnosis, and is a diagram showing a sequence from the start of a process to the permission to start a communication.
Figure 11:
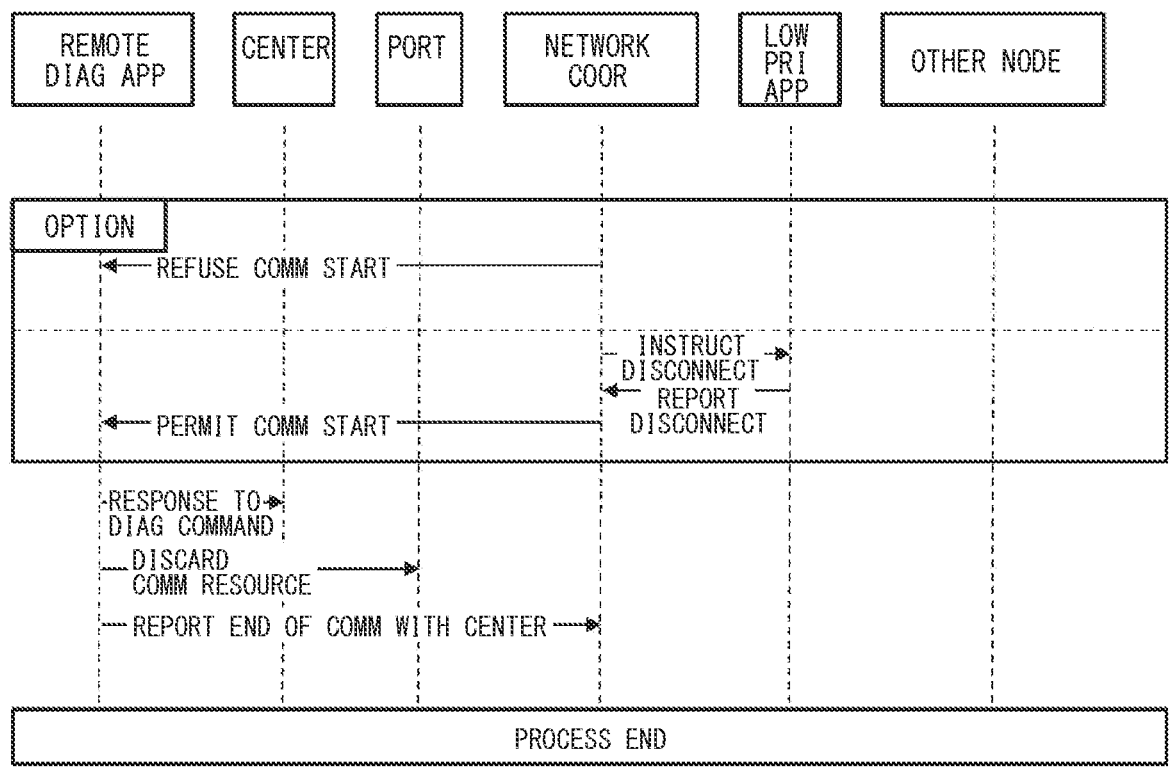
FIG. 11 is a diagram showing a continuation of the sequence in FIG. 9.

FIGS. 10 and 11 are diagrams illustrating a sequence in a remote diagnosis. FIG. 10 shows a sequence from the start of the process to the permission to start the communication. FIG. 11 is a continuation of the sequence of FIG. 10.

The remote diagnosis is-performed when the system remotely self-diagnoses. The process starts when the remote diagnosis application requests the network coordinator to permit to connect to the center. For example, a remote diagnosis application is executed by a central ECU. Various ECUs having a diagnostic function, such as an engine ECU, each correspond to another node.

The network coordinator 20 determines whether to permit the connection between the remote diagnosis application and the center. If the connection is permitted, the network coordinator 20 issues the connection permission. Alternatively, if the connection is not permitted, the network coordinator issues the connection refusal. Alternatively, it is determined whether or not there is an application (low priority application) having a lower priority than the remote diagnosis application. If there is a low priority application, the low priority application is instructed to disconnect. When the low priority application disconnects, the low priority application notifies the network coordinator 20 of the communication end. As this increases the communication resource, the network coordinator 20 notifies the remote diagnosis application of the permission of connection with the center.

If the connection is permitted, the remote diagnosis application secures the communication resource and connects to the center. The center transmits the diagnosis setting data to the remote diagnosis application. The center transmits a trigger to start diagnosis to the remote diagnosis application. The remote diagnosis application requires the network coordinator 20 to permit the connection to the diagnosis application on another node.

The network coordinator 20 determines whether to permit the remote diagnosis application to connect with another node. When the connection with another node is permitted, the network coordinator 20 permits the remote diagnosis application to connect with another node. Alternatively, if the connection with another node is not permitted, the remote diagnosis application is notified of the connection refusal. Alternatively, it is determined whether or not there is an application (low priority application) having a lower priority than the remote diagnosis application. If there is a low priority application, the low priority application is instructed to disconnect. When the low priority application disconnects, the low priority application notifies the network coordinator 20 of the communication end. This increases the communication resource, so the network coordinator 20 permits the remote diagnosis application to connect to another node.

When the connection with another node is permitted, the communication resource is secured and the remote diagnosis application connects with the diagnosis application on another node. The remote diagnosis applications transmits a diagnostic command to the diagnosis application. The diagnosis application transmits a response to the command to the remote diagnosis application.

When the remote diagnosis application completes receiving the response to the diagnosis command, the remote diagnosis application disconnects from the diagnosis application on another node. The remote diagnosis application notifies the network coordinator 20 that it has disconnected from another node. Since the remote diagnosis application will transmit the response to the diagnosis command to the center, it notifies the network coordinator 20 that the traffic will increase.

The network coordinator 20 determines whether to permit the communication start. When the communication start is permitted, the permission of the communication start is issued to the remote diagnosis application. Alternatively, if the communication start is not permitted, the refusal of the communication start is issued. Alternatively, it is determined if there is a low priority application. If there is a low priority application, the low priority application is instructed to disconnect. When the low priority application disconnects, the low priority application notifies the network coordinator 20 of the communication end. This increases the communication resource, so the network coordinator 20 issues a permission of the start of the communication with the center, to the remote diagnosis application.

When the remote diagnosis application is permitted to start the communication, the remote diagnosis application transmits a response to the diagnostic command to the center. The remote diagnosis application notifies the network coordinator 20 of the end of the communication with the center. This completes the communication process using the remote diagnosis application.

For reference to further explain features of the present disclosure, the description is added as follows.

There is provided a technique for suppressing a decrease in communication speed in communication between an external device and an internal device. According to the configuration in the above technique, it is determined whether to permit the data communication between a first communication device and a second communication device as a communication partner of the first communication device based on predetermined authentication information included in the first communication frame used for the first communication protocol received from the first communication device. When the data communication is permitted, a control signal is output which sets the second communication device as the communication partner to a connection destination.

The number of electronic control units (ECUs) mounted on vehicles has been increasing. Further, as a vehicle control method, it is assumed that a central ECU is arranged and a plurality of in-vehicle ECUs, sensors, actuators, and a cloud or a center are connected to the central ECU. It is necessary to properly monitor communication inside the vehicle and communication between inside and outside the vehicle. In-vehicle Ethernet may require reliable data transmission, real-time performance, and communication of large volumes of data. In a vehicle, it is necessary to realize communication between ECUs, between ECUs and sensors, between ECUs and actuators, between ECUs and outside communication terminals, etc. using a predetermined band (for example, 1 Gbps). It is necessary to make effective use of communication resources. Further, it is necessary to give priority to the communication having a high priority over the communication having a low priority.

It is thus desired to provide a technique for managing a communication network that makes effective use of communication resources and provides an environment permitting an application requesting communication to communicate at an appropriate timing.

According to aspects of the present disclosure, the following communication methods and communication management methods are provided. Further, the present disclosure can be realized in various aspects such as a network coordinator, a network coordinator program product, a storage medium for storing the network coordinator program product, an in-vehicle communication system, an in-vehicle communication management system, and the like. The network coordinator corresponds to a communication management device or a communication management controller.

According to an aspect of the present disclosure, a communication method is provided in a vehicle system. The vehicle system includes (i) a plurality of applications issuing a request for a communication with an outside of a vehicle, (ii) a communicator device performing the communicating, and (iii) a network coordinator managing the request for the communication from the plurality of applications.

The communication method in the vehicle system includes the followings: (i) an application of the plurality of applications issuing a request for a connection with an outside of the vehicle to the network coordinator; (ii) in response to receiving the request for the connection with the outside of the vehicle from the application, the network coordinator determining whether or not to permit the connection with the outside of the vehicle and reporting a determination result of the connection with the outside of the vehicle to the application; (iii) in response to the connection with the outside of the vehicle being permitted by the network coordinator, the application issuing a request for establishing the connection with the outside of the vehicle to the communicator device; (iv) in response to needing to download or upload a file after the connection with the outside of the vehicle is established, the application issuing a request for a start of a data transmission and reception to the network coordinator; (v) in response to receiving the request for the start of the data transmission and reception from the application, the network coordinator determining whether or not to permit the start of the data transmission and reception, and reporting a determination result of the start of the data transmission and reception to the application; (vi) in response to the start of the data transmission and reception being permitted by the network coordinator, the application starting downloading or uploading the file; and (vii) in response to downloading or uploading the file being completed, the application reporting an end of the data transmission and reception to the network coordinator.

According to another aspect of the present disclosure, a communication method is provided in a vehicle system. The vehicle system includes: (i) a plurality of applications issuing a request for a communication with an outside of a vehicle or an inside of the vehicle, (ii) an electronic control unit receiving an instruction from the plurality of applications, (iii) a communicator device performing the communicating, and (iv) a network coordinator managing the request for the communication from the plurality of applications.

The communication method in the vehicle system includes the followings: (i) an application of the plurality of applications issuing a request for a connection with an outside of the vehicle to the network coordinator; (ii) in response to receiving the request for the connection with the outside of the vehicle from the application, the network coordinator determining whether or not to permit the connection with the outside of the vehicle and reporting a determination result of the connection with the outside of the vehicle to the application; (iii) in response to the connection with the outside of the vehicle being permitted by the network coordinator, the application issuing a request for establishing the connection with the outside of the vehicle to the communicator device; (iv) in response to needing to download or upload a file after the connection with the outside of the vehicle is established, the application issuing a request for a start of a data transmission and reception to the network coordinator; (v) in response to receiving the request for the start of the data transmission and reception from the application, the network coordinator determining whether or not to permit the start of the data transmission and reception, and reporting a determination result of the start of the data transmission and reception to the application; (vi) in response to the start of the data transmission and reception being permitted by the network coordinator, the application starting downloading or uploading the file; (vii) in response to downloading or uploading the file being completed, the application reporting an end of the data transmission and reception to the network coordinator; (viii) the application issuing a request for a connection with the electronic control unit in the inside of the vehicle to the network coordinator; (ix) in response to receiving the request for the connection with the electronic control unit in the inside of the vehicle from the application, the network coordinator determining whether or not to permit the connection with the electronic control unit in the inside of the vehicle, and reporting a determination result of the connection with the electronic control unit in the inside of the vehicle to the application; (x) in response to the connection in the inside of the vehicle being permitted by the network coordinator, the application establishing the connection with the electronic control unit in the inside of the vehicle; and (xi) in response to a communication process with the electronic control unit being completed after the connection with the electronic control unit is established, the application reporting an end of the connection in the inside of the vehicle to the network coordinator.

Further, the communication method may further include: in response to receiving the request for the connection with the outside of the vehicle from the application, the network coordinator issuing an instruction of stopping the connection with the outside of the vehicle to a different application of the plurality of applications, the different application having a priority lower than a priority of the application.

Further, the communication method may further include: in response to receiving the request for the start of the data transmission and reception from the application, the network coordinator issuing an instruction of stopping the data transmission and reception to a different application of the plurality of applications, the different application having a priority lower than a priority of the application.

Further, the communication method may further include: in response to receiving a request for a connection with an inside of the vehicle from the application, the network coordinator issuing an instruction of stopping the connection with the inside of the vehicle to a different application of the plurality of applications, the different application having a priority lower than a priority of the application.

Further, the communication method may further include: the application reporting an end of the connection with the outside of the vehicle to the network coordinator after issuing a request for stopping the connection with the outside of the vehicle to the communicator device.

Further, the communication method may further include: the network coordinator monitoring a communication band outside or inside the vehicle and reporting to the plurality of applications in response to the communication band being limited.

According to yet another aspect of the present disclosure, a communication management method for an in-vehicle network is provided as including the followings: (i) monitoring a usage state of a resource of a communication in the in-vehicle network in the vehicle; (ii) receiving a request for a connection with a node in an outside or in an inside of the vehicle from an application in the vehicle; (iii) determining whether or not to permit the request for the connection from the application based on the usage state of the resource of the communication, and reporting a determination result to the application; (iv) monitoring the communication resource being secured and the connection with the node in the outside or in the inside of the vehicle being established by the application that is permitted to establish the connection; and (v) receiving a notification of an end of the communication from the application in response to the application ending the communication with the node and discarding the resource of the communication.

Further, the communication management method may further include: (i) issuing an instruction of ending the communication to the application that is establishing the connection with the node in the inside or in the outside of the vehicle after being permitted to establish the connection; (ii) storing priorities of a first application and a second application included in the application in the vehicle; (iii) comparing the priority of the second application with the priority of the first application in response to receiving a request for a connection from the second application in a situation where the first application is establishing the connection with the node in the inside or in the outside of the vehicle; and (iv) issuing an instruction of ending the communication to the first application in response to the priority of the first application being lower than the priority of the second application.

Further, in the communication management method, the node may be an electronic control unit in the vehicle.

Further, in the communication management method, the node may be a center in the outside of the vehicle.

Further, in the communication management method, the communication in the in-vehicle network may be based on Ethernet, and the bandwidth used as the usage state of the resource of the communication may be monitored.

According to the aspects of the present disclosure, it is possible to effectively utilize the communication resource in the in-vehicle network and provide an environment enabling the application requesting communication to communicate at an appropriate timing.

The controller or controller circuit such as an electronic control unit 1, 1A or a network coordinator 20 described in the above may be achieved by software basis, or by hardware basis, or by a combination of software basis and hardware basis. More specifically, the controller or controller circuit and method described in the present disclosure in the above embodiment may be implemented by one or more special-purpose computers.

Such computers may be created (i) by configuring (a) a memory and a processor programmed to execute one or more particular functions embodied in computer programs, or (ii) by configuring (b) a processor provided by one or more special-purpose hardware logic circuits, or (iii) by configuring a combination of (a) a memory and a processor programmed to execute one or more particular functions embodied in computer programs and (b) a processor provided by one or more special-purpose hardware logic circuits. The computer programs may be stored, as instructions to be executed by a computer, in a tangible non-transitory computer-readable medium. The present disclosure is not limited to the above embodiments. Various modifications may be implemented without departing from the spirit of the present disclosure.

While the present disclosure has been described with reference to the embodiment thereof, it is to be understood that the disclosure is not limited to the embodiment and constructions. The present disclosure also encompasses various modifications and variations within an equivalent range. Furthermore, various combinations and examples, and other combinations and examples including only one, more or less element, fall within the spirit and scope of the present disclosure.

What is claimed is:

1. A communication method implemented by at least one processor to a vehicle system including (i) a plurality of applications issuing a request for a communication with a node outside of a vehicle, (ii) a communicator device performing the communicating, and (iii) a network coordinator managing the request for the communication from the plurality of applications, the communication method comprising: an application of the plurality of applications issuing a request for a connection with a node outside of the vehicle to the network coordinator;

in response to receiving the request for the connection with the node outside of the vehicle from the application, the network coordinator determining whether or not to permit the connection with the node outside of the vehicle and reporting a determination result of the connection with the node outside of the vehicle to the application;

in response to the connection with the node outside of the vehicle being permitted by the network coordinator, the application issuing a request for establishing the connection with the node outside of the vehicle to the communicator device;

in response to needing to download or upload a file after the connection with the node outside of the vehicle is established, the application issuing a request for a start of a data transmission and reception to the network coordinator;

in response to receiving the request for the start of the data transmission and reception from the application, the network coordinator determining whether or not to permit the start of the data transmission and reception, and reporting a determination result of the start of the data transmission and reception to the application;

in response to the start of the data transmission and reception being permitted by the network coordinator, the application starting downloading or uploading the file; and in response to downloading or uploading the file being completed, the application reporting an end of the data transmission and reception to the network coordinator.

2. A communication method implemented by at least one processor to a vehicle system including (i) a plurality of applications issuing a request for a communication with a node outside of a vehicle or an inside of the vehicle, (ii) an electronic control unit receiving an instruction from the plurality of applications, (iii) a communicator device performing the communicating, and (iv) a network coordinator managing the request for the communication from the plurality of applications, the communication method comprising:

an application of the plurality of applications issuing a request for a connection with a node outside of the vehicle to the network coordinator;

in response to receiving the request for the connection with the node outside of the vehicle from the application, the network coordinator determining whether or not to permit the connection with the node outside of the vehicle and reporting a determination result of the connection with the node outside of the vehicle to the application;

in response to the connection with the node outside of the vehicle being permitted by the network coordinator, the application issuing a request for establishing the connection with the node outside of the vehicle to the communicator device;

in response to needing to download or upload a file after the connection with the node outside of the vehicle is established, the application issuing a request for a start of a data transmission and reception to the network coordinator;

in response to receiving the request for the start of the data transmission and reception from the application, the network coordinator determining whether or not to permit the start of the data transmission and reception, and reporting a determination result of the start of the data transmission and reception to the application;

in response to the start of the data transmission and reception being permitted by the network coordinator, the application starting downloading or uploading the file;

in response to downloading or uploading the file being completed, the application reporting an end of the data transmission and reception to the network coordinator;

the application issuing a request for a connection with the electronic control unit in the inside of the vehicle to the network coordinator;

in response to receiving the request for the connection with the electronic control unit in the inside of the vehicle from the application, the network coordinator determining whether or not to permit the connection with the electronic control unit in the inside of the vehicle, and reporting a determination result of the connection with the electronic control unit in the inside of the vehicle to the application;

in response to the connection in the inside of the vehicle being permitted by the network coordinator, the application establishing the connection with the electronic control unit in the inside of the vehicle; and in response to a communication process with the electronic control unit being completed after the connection with the electronic control unit is established, the application reporting an end of the connection in the inside of the vehicle to the network coordinator.

3. The communication method according to claim 1, further comprising:

in response to receiving the request for the connection with the node outside of the vehicle from the application, the network coordinator issuing an instruction of stopping the connection with the node outside of the vehicle to a different application of the plurality of applications, the different application having a priority lower than a priority of the application.

4. The communication method according to claim 1, further comprising:

in response to receiving the request for the start of the data transmission and reception from the application, the network coordinator issuing an instruction of stopping the data transmission and reception to a different application of the plurality of applications, the different application having a priority lower than a priority of the application.

5. The communication method according to claim 1, further comprising:

in response to receiving a request for a connection with an inside of the vehicle from the application, the network coordinator issuing an instruction of stopping the connection with the inside of the vehicle to a different application of the plurality of applications, the different application having a priority lower than a priority of the application.

6. The communication method according to claim 1, further comprising:

the application reporting an end of the connection with the node outside of the vehicle to the network coordinator after issuing a request for stopping the connection with the node outside of the vehicle to the communicator device.

7. The communication method according to claim 1, further comprising:

the network coordinator monitoring a communication band outside or inside the vehicle, and reporting to the plurality of applications in response to the communication band being limited.

8. The communication method according to claim 1, further comprising:

the application issuing a request for a connection with an electronic control unit in the inside of the vehicle to the network coordinator;

in response to receiving the request for the connection with the electronic control unit in the inside of the vehicle from the application, the network coordinator determining whether or not to permit the connection with the electronic control unit in the inside of the vehicle, and reporting a determination result of the connection with the electronic control unit in the inside of the vehicle to the application;

in response to the connection in the inside of the vehicle being permitted by the network coordinator, the application establishing the connection with the electronic control unit in the inside of the vehicle; and in response to a communication process with the electronic control unit being completed after the connection with the electronic control unit is established, the application reporting an end of the connection in the inside of the vehicle to the network coordinator.

9. The communication method according to claim 1, wherein:
the vehicle system further includes: a memory storing programs to be executed by the processor to implement an operating system and the plurality of applications configured to operate on the operating system; and a controller including the network coordinator configured to operate on the operating system.

\* \* \* \* \*